(12) United States Patent
Salmeron

(10) Patent No.: US 12,482,614 B2
(45) Date of Patent: Nov. 25, 2025

(54) FLIP GUARD SAFETY SYSTEMS FOR AIRCRAFT SWITCHES

(71) Applicant: Textron Innovations Inc., Providence, RI (US)

(72) Inventor: Luis Erana Salmeron, Irving, TX (US)

(73) Assignee: Textron Innovations Inc., Providence, RI (US)

( * ) Notice: Subject to any disclaimer, the term of this patent is extended or adjusted under 35 U.S.C. 154(b) by 405 days.

(21) Appl. No.: 18/135,147

(22) Filed: Apr. 15, 2023

(65) Prior Publication Data
US 2024/0347287 A1 Oct. 17, 2024

(51) Int. Cl.
*H01H 9/28* (2006.01)
*B64D 43/00* (2006.01)

(52) U.S. Cl.
CPC .............. *H01H 9/287* (2013.01); *B64D 43/00* (2013.01); *H01H 2300/024* (2013.01)

(58) Field of Classification Search
CPC .......... H01H 9/282; H01H 9/283; H01H 9/26; H01H 9/281; H01H 9/286; H01H 11/0006; H01H 2071/507; H01H 2071/565; H01H 21/06; H01H 2300/06; H01H 27/002; H01H 71/128; H01H 71/54; H01H 77/101; H01H 9/223; H01H 9/28
See application file for complete search history.

(56) References Cited

U.S. PATENT DOCUMENTS

| | | | |
|---|---|---|---|
| 6,015,956 A * | 1/2000 | Green | H01H 9/283 200/43.14 |
| 9,496,696 B2 | 11/2016 | Bulancea | |
| 10,173,785 B2 | 1/2019 | Leachman et al. | |

* cited by examiner

*Primary Examiner* — Ahmed M Saeed
(74) *Attorney, Agent, or Firm* — Lawrence Youst PLLC

(57) ABSTRACT

A flip guard safety system for preventing inadvertent actuation of an aircraft switch. The flip guard safety system includes a flip guard having a cover that pivots between a guarded positions in which the cover protects the aircraft switch against inadvertent actuation and an unguarded position in which the cover provides access to the aircraft switch. A flip guard safety has a gate that pivots between a closed position in which the gate retains the cover in the guarded position and an open position in which the gate does not retain the cover in the guarded position, such that the cover is pivotable from the guarded position to the unguarded position. The gate pivots from the closed position to the open position in a first direction and the cover pivots from the guarded position to the unguarded position a second direction that is opposite of the first direction.

20 Claims, 8 Drawing Sheets

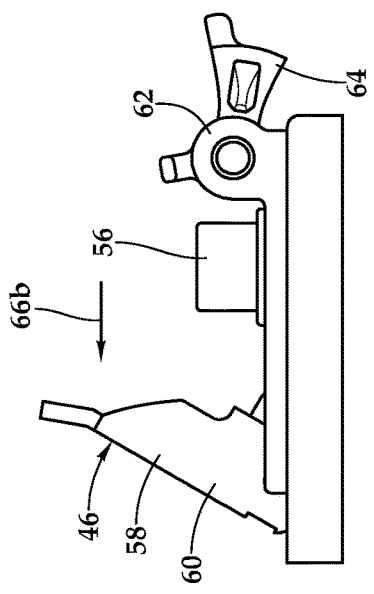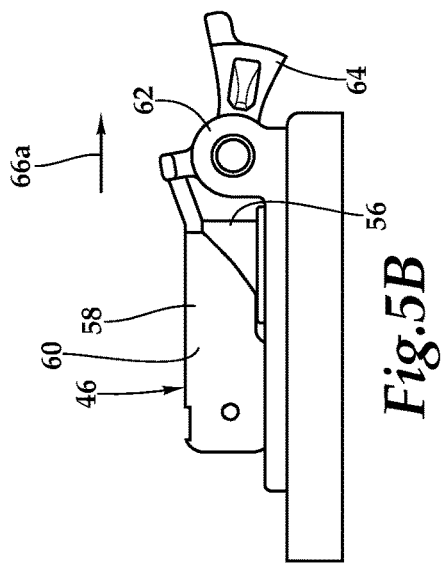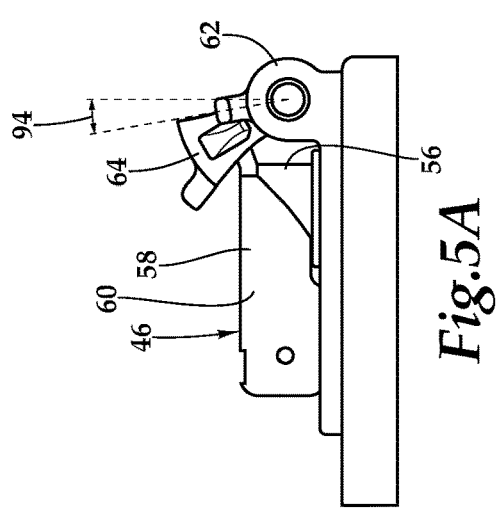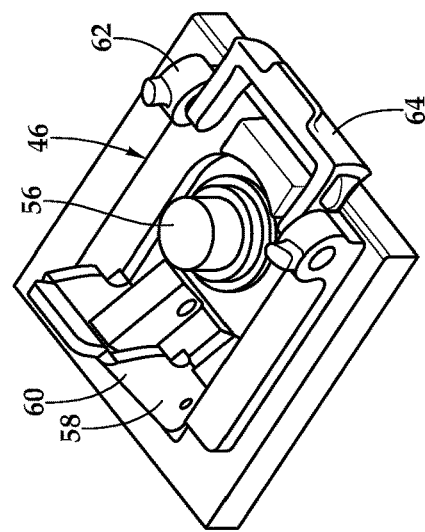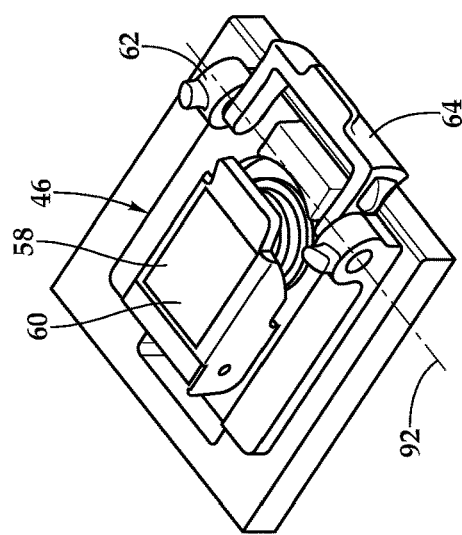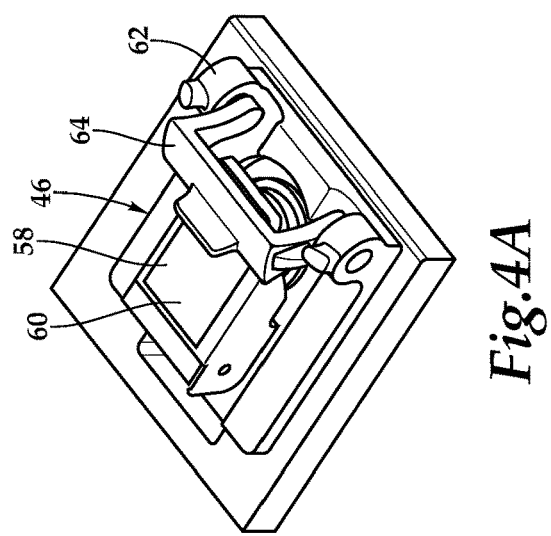

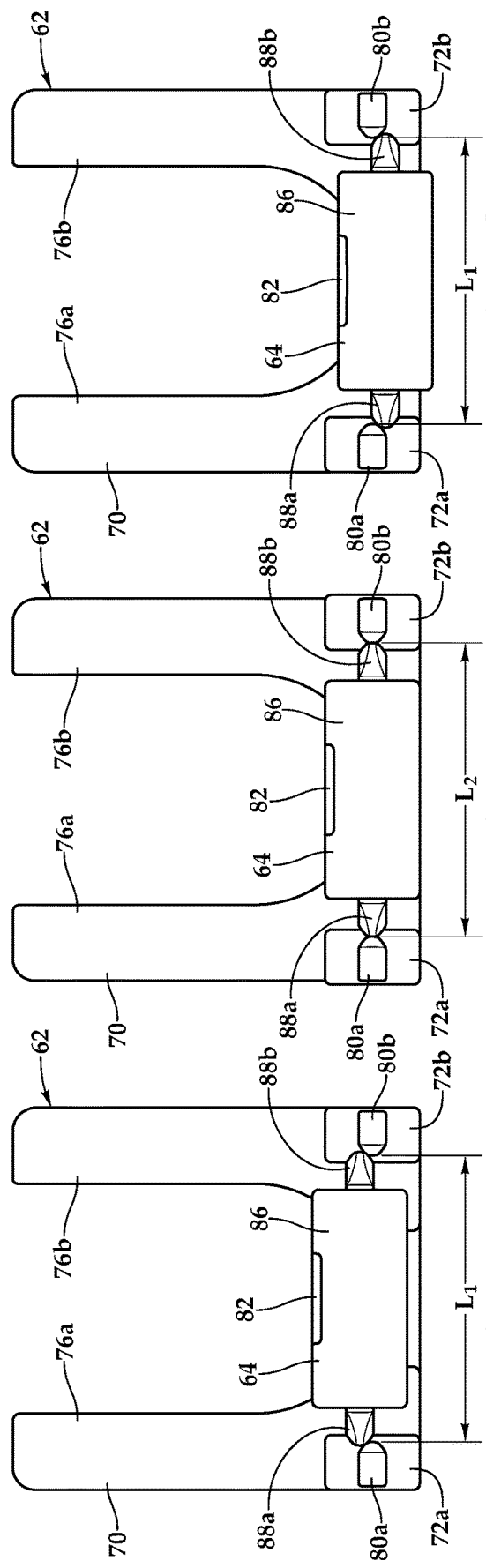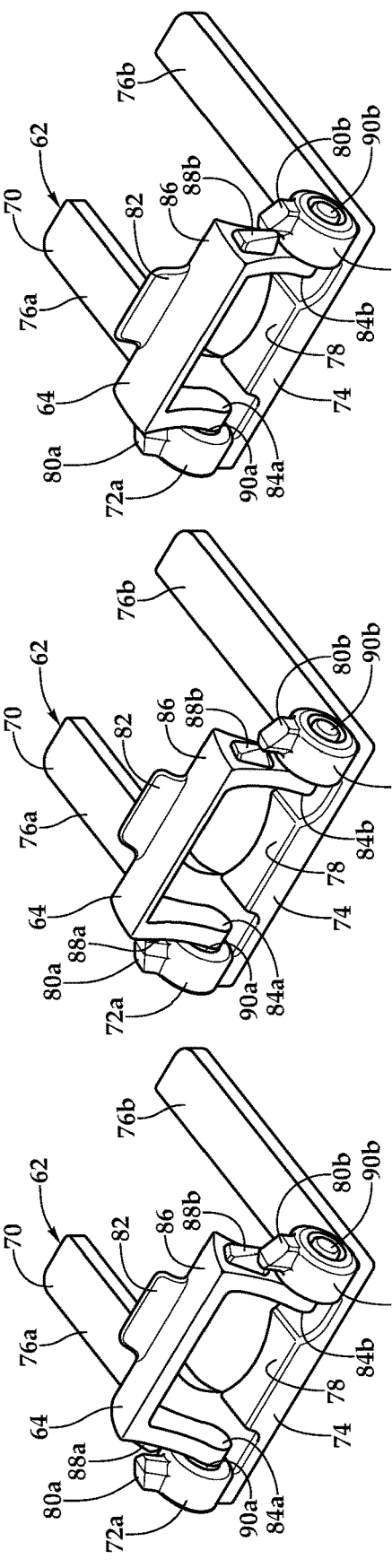

FLIP GUARD SAFETY SYSTEMS FOR AIRCRAFT SWITCHES

TECHNICAL FIELD OF THE DISCLOSURE

The present disclosure relates, in general, to safety systems used to prevent inadvertent actuation of aircraft switches and, in particular, to flip guard safety systems used to prevent unintended lifting of a flip guard that protects and potentially arms an aircraft switch, the inadvertent actuation of which could result in an unsafe condition during flight.

BACKGROUND

Modern aircraft typically include a flight deck having a multitude of displays and controls. For example, a flight deck may include one or more primary flight displays, one or more multi-function displays and a one or more control panels. The primary flight displays may be configured to display situational flight information such as speed, attitude, vertical rate, altitude, flight progress, GPS location, plotted versus actual course and the like. The multi-function displays may be configured to display navigation route, map, weather radar, ground proximity warning system information, traffic collision avoidance information and the like. The control panels may include controls that enable a pilot to input automated flight behavior such as instructions for the aircraft to hold a specific altitude, speed, or heading, to change altitude or speed at a specific rate, or to input a new heading. In addition, the control panels may include numerous aircraft switches that enable a pilot to interact with and control specific aircraft systems including emergency aircraft systems. As inadvertent actuation of certain emergency aircraft switches may result in unsafe conditions during flight, aviation agencies have promulgated regulations requiring dual action activation of such emergency aircraft switches. In most situations, the inclusion of a flip guard covering such an emergency aircraft switch meets the dual action requirement and provides the desired level of safety. It has been found, however, the depending upon the location of the flip guard within the flight deck, unintended lifting of a flip guard may occur which not only frustrates the dual action requirement, but also exposes the emergency aircraft switch to inadvertent actuation.

SUMMARY

In a first aspect, the present disclosure is directed to a flip guard safety system for preventing inadvertent actuation of an aircraft switch. The flip guard safety system includes a flip guard having a cover that pivots between guarded and unguarded positions. In the guarded position, the cover is configured to protect the aircraft switch against inadvertent actuation. In the unguarded position, the cover is configured to provide access to the aircraft switch. A flip guard safety has a gate that pivots between closed and open positions. In the closed position, the gate retains the cover of the flip guard in the guarded position. In the open position, the gate does not retain the cover of the flip guard in the guarded position, such that the cover of the flip guard is pivotable from the guarded position to the unguarded position. The gate of the flip guard safety pivots from the closed position to the open position in a first direction and the cover of the flip guard pivots from the guarded position to the unguarded position in a second direction that is opposite of the first direction, thereby requiring dual opposing operation to provide access to the aircraft switch.

In some embodiments, the aircraft switch may be an emergency aircraft switch. In certain embodiments, the aircraft switch may be a hand switch such as a pushbutton switch, a rocker switch, a toggle switch or a dial switch. In some embodiments, the cover of the flip guard may be a spring-loaded cover such that the guarded position and the unguarded position of the cover are stable positions. In certain embodiments, the aircraft switch may be transitioned from an unarmed state to an armed state when the cover of the flip guard pivots from the guarded position to the unguarded position. In some embodiments, the flip guard safety may include a base having first and second receivers, and the gate may include a first pin that may be positioned within the first receiver and a second pin that may be positioned within the second receiver forming a hinge with a hinge axis about which the gate pivots between the open and closed positions. In certain embodiments, the first receiver may include a first stop, the second receiver may include a second stop and the gate may include a first arm having a first tab and a second arm having a second tab such that the first stop interferes with the first tab and the second stop interferes with the second tab to resist the gate pivoting from the closed position to the open position. In some embodiments, the distance between the first and second stops may increase as the first and second tabs pass between the first and second stops when the gate pivots from the closed position to the open position.

In certain embodiments, the base of the flip guard safety may include a shelf disposed between the first and second receivers. In some embodiments, the base of the flip guard safety may include a first leg extending from the first receiver and a second leg extending from the second receiver. In such embodiments, the aircraft switch may be disposed between the first and second legs, and the flip guard may at least partially be disposed between the first and second legs. In certain embodiments, the base of the flip guard safety may be substantial horizontally oriented. In other embodiments, the base of the flip guard safety may be non-horizontally oriented.

In a second aspect, the present disclosure is directed to a flight deck for an aircraft. The flight deck includes an aircraft switch and a flip guard having a cover that pivots between guarded and unguarded positions. In the guarded position, the cover is configured to protect the aircraft switch against inadvertent actuation. In the unguarded position, the cover is configured to provide access to the aircraft switch. A flip guard safety has a gate that pivots between closed and open positions. In the closed position, the gate retains the cover of the flip guard in the guarded position. In the open position, the gate does not retain the cover of the flip guard in the guarded position, such that the cover of the flip guard is pivotable from the guarded position to the unguarded position. The gate of the flip guard safety pivots from the closed position to the open position in a first direction and the cover of the flip guard pivots from the guarded position to the unguarded position in a second direction that is opposite of the first direction, thereby requiring dual opposing operation to provide access to the aircraft switch.

In a third aspect, the present disclosure is directed to an aircraft that includes a fuselage with a flight deck positioned therein. The flight deck includes an aircraft switch and a flip guard having a cover that pivots between guarded and unguarded positions. In the guarded position, the cover is configured to protect the aircraft switch against inadvertent actuation. In the unguarded position, the cover is configured to provide access to the aircraft switch. A flip guard safety has a gate that pivots between closed and open positions. In the closed position, the gate retains the cover of the flip guard in the guarded position. In the open position, the gate does not retain the cover of the flip guard in the guarded position, such that the cover of the flip guard is pivotable from the guarded position to the unguarded position. The gate of the flip guard safety pivots from the closed position to the open position in a first direction and the cover of the flip guard pivots from the guarded position to the unguarded position in a second direction that is opposite of the first direction, thereby requiring dual opposing operation to provide access to the aircraft switch.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 4A-4C are sequential views showing a flip guard safety system for preventing inadvertent actuation of an aircraft switch in various positions in accordance with embodiments of the present disclosure;

FIGS. 5A-5C are sequential views showing a flip guard safety system for preventing inadvertent actuation of an aircraft switch in various positions in accordance with embodiments of the present disclosure;

FIGS. 6A-6C are sequential views showing a flip guard safety system for preventing inadvertent actuation of an aircraft switch in various positions in accordance with embodiments of the present disclosure;

FIGS. 7A-7C are sequential views showing a flip guard safety system for preventing inadvertent actuation of an aircraft switch in various positions in accordance with embodiments of the present disclosure;

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1:
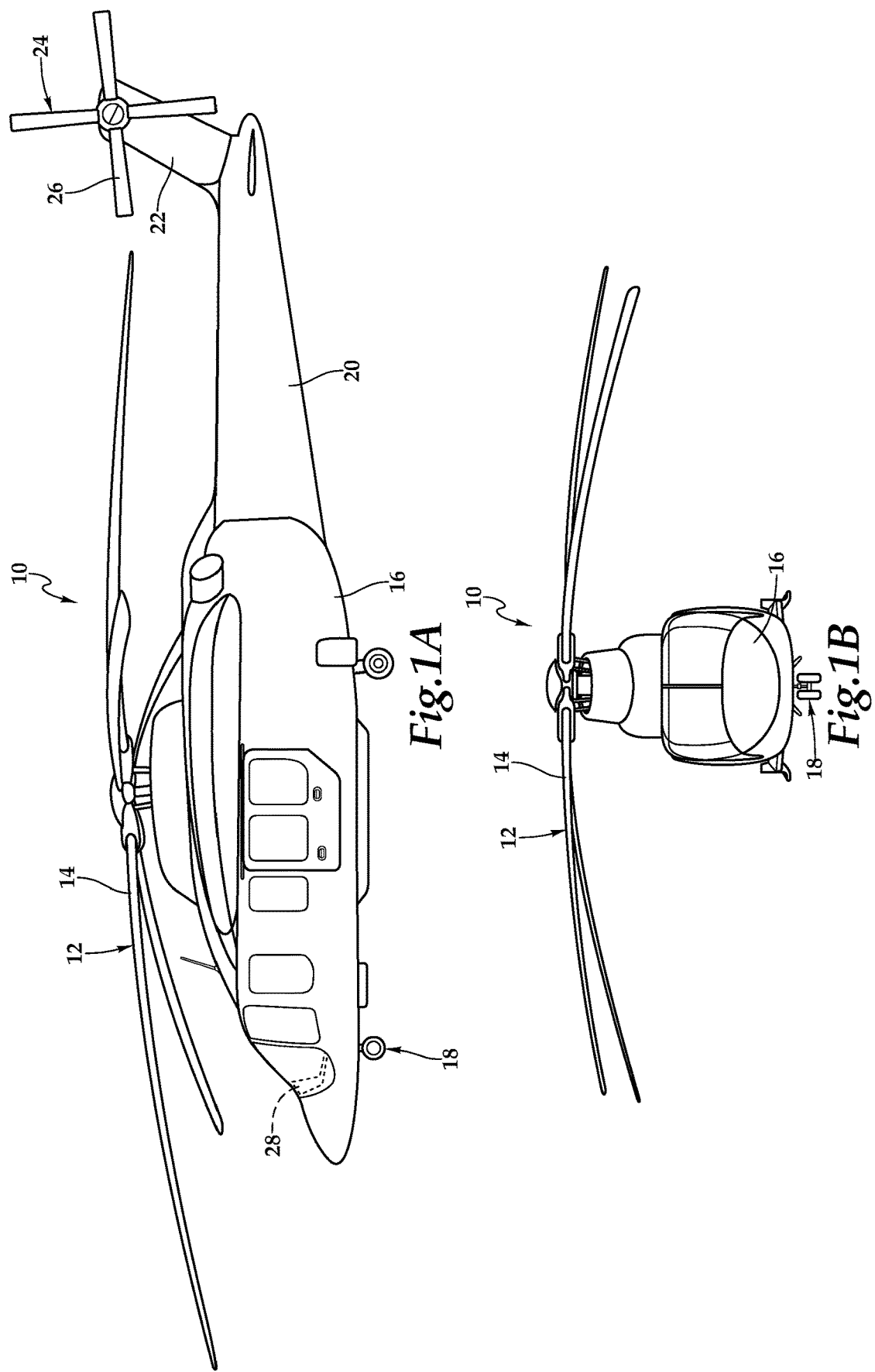
FIGS. 1A-1B are schematic illustrations of an exemplary rotorcraft incorporating a flip guard safety system for preventing inadvertent actuation of an aircraft switch in accordance with embodiments of the present disclosure.

Referring to FIGS. 1A-1B in the drawings, an aircraft depicted as a rotorcraft, and more particularly as a helicopter, is schematically illustrated and generally designated 10. Aircraft 10 has a main rotor assembly 12 that includes a plurality of rotor blades 14. Main rotor assembly 12 is rotatable relative to a fuselage 16 of aircraft 10. The pitch of rotor blades 14 can be collectively and/or cyclically manipulated to selectively control direction, thrust and lift of aircraft 10. A landing gear system 18 provides ground support for aircraft 10. A tailboom 20 extends aftwardly from fuselage 16. An anti-torque system 24 includes a tail rotor assembly 26 that is rotatably coupled to an aft portion 22 of tailboom 20. Aircraft 10 has a flight deck 28 that provides a pilot interface for receiving information from aircraft 10 and providing input to aircraft 10 including multiple displays and controls such as one or more aircraft switches having a flip guard safety system associated therewith to prevent inadvertent actuation of such protected aircraft switches.

It should be appreciated that aircraft 10 is merely illustrative of a variety of aircraft that can implement the embodiments disclosed herein. Indeed, the flip guard safety systems disclosed herein may be utilized on any aircraft that uses aircraft switches. Other aircraft implementations can include fixed wing aircraft, tiltrotor aircraft, tiltwing aircraft, hybrid aircraft, gyrocopters, electric aircraft and the like. As such, those skilled in the art will recognize that the flip guard safety systems disclosed herein can be integrated into a variety of aerial vehicle configurations including spacecraft. It should also be appreciated that even though aircraft are particularly well-suited to implement the embodiments of the present disclosure, non-aircraft vehicles and devices can also implement the embodiments of the flip guard safety systems disclosed herein.

Figure 2:
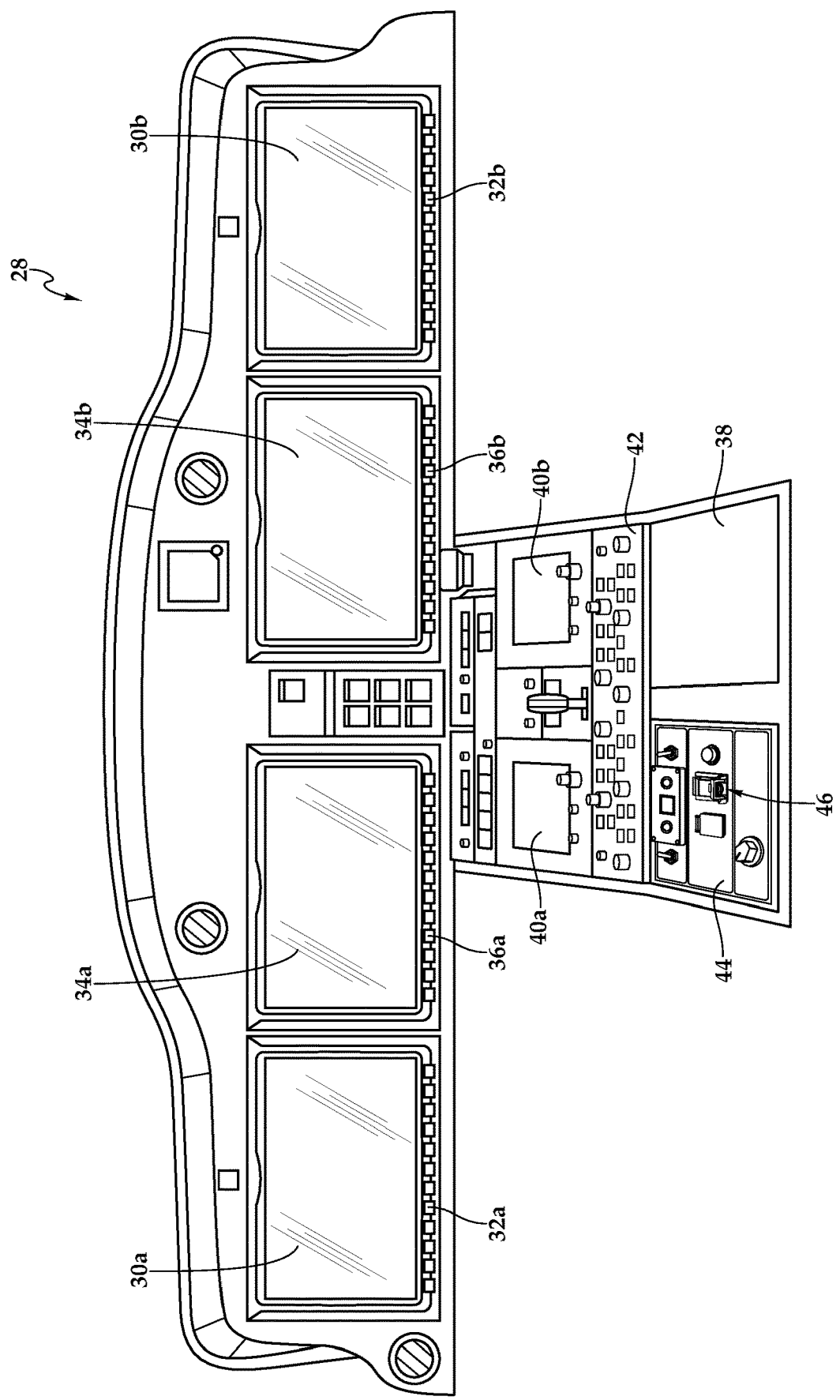
FIG. 2 is a schematic illustration of a flight deck of a rotorcraft incorporating a flip guard safety system for preventing inadvertent actuation of an aircraft switch in accordance with embodiments of the present disclosure.

Referring to FIG. 2 in the drawings, flight deck 28 of aircraft 10 will be disclosed in greater detail. Flight deck 28 includes primary flight displays 30a, 30b for the display of flight information to the pilot and copilot of aircraft 10. For example, primary flight displays 30a, 30b may provide flight information including, but is not limited to, airspeed, altitude, attitude, heading, course deviation indicator and map. Primary flight displays 30a, 30b may be LCD screens, LED screens or any other suitable type of display system. In the illustrated embodiment, primary flight display 30a includes a plurality of inputs 32a located on the frame thereof. Similarly, primary flight display 30b includes a plurality of inputs 32b located on the frame thereof. Inputs 32a, 32b may be soft keys or hard keys for the control of primary flight displays 30a, 30b, respectively.

Positioned between primary flight displays 30a, 30b are multi-function displays 34a, 34b that may display navigation route, map, weather radar, ground proximity warning system information, traffic collision avoidance information and/or additional flight information to the pilot and copilot of aircraft 10. In the illustrated embodiment, multi-function display 34a includes a plurality of inputs 36a in the frame thereof. Similarly, multi-function display 34b includes a plurality of inputs 36b in the frame thereof. Inputs 36a, 36b may be soft keys or hard keys for the control of multi-function displays 34a, 34b, respectively. Located on a center stack 38, between the pilot and copilot of aircraft 10, are multi-function control units 40a, 40b which are customizable touch screens configured for the control of multi-function displays 34a, 34b, respectively. Multi-function control units 40a, 40b may utilize buttons, bezels, dials, joysticks or any other type of physical inputs, rather than, or in addition to, touch screens. Below multi-function control units 40a, 40b is a combined controller 42 that is used to control primary flight displays 30a, 30b and to control automated flight behavior such as, but is not limited to, holding a specific altitude, speed, or heading, and changing altitude or speed at a specific rate. Below combined controller 42 on the left side of center stack 38 is a control panel 44 that includes a pushbutton switch that is protected by a flip guard safety system 46.

Figure 3:
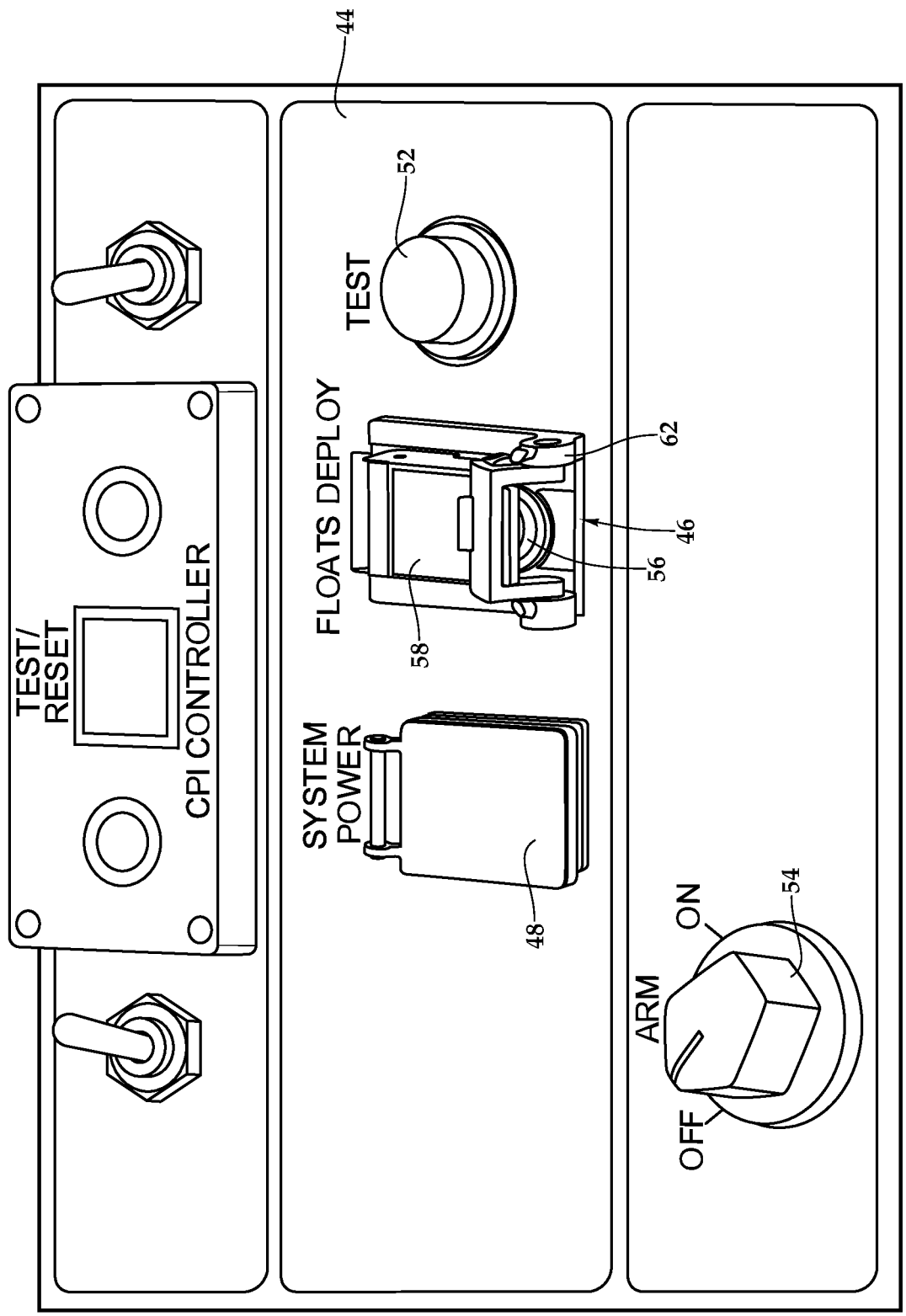
FIG. 3 is an enlarged view of a control panel of a flight deck of a rotorcraft incorporating a flip guard safety system for preventing inadvertent actuation of an aircraft switch in accordance with embodiments of the present disclosure.

Referring additionally to FIG. 3 in the drawings, control panel 44 of aircraft 10 will be disclosed in greater detail. Control panel 44 includes a pushbutton switch 56 that is protected by flip guard safety system 46 and that when actuated, deploys floats to prevent aircraft 10 from sinking after an emergency water landing. Control panel 44 also includes a pushbutton switch that is protected by a cover 48 that is actuated to power the emergency water landing system and a pushbutton switch 52 for testing the emergency water landing system. In addition, control panel 44 includes a dial switch 54 that is used to arm, turn on and turn off an emergency egress lighting system. As best seen in FIG. 4C, pushbutton switch 56 may be referred to as an emergency switch as actuation of pushbutton switch 56 performs the emergency function of deploying the floats following an emergency water landing. Because an inadvertent actuation of pushbutton switch 56 during flight would result in an unsafe condition, pushbutton switch 56 is protected by a flip guard 58. In the illustrated embodiment, flip guard 58 includes a cover 60 that pivots between a guarded position, as best seen in FIG. 5B, and an unguarded position, as best seen in in FIG. 5C. In the guarded position, cover 60 protects pushbutton switch 56 against inadvertent actuation. In the unguarded position, cover 60 provides access to pushbutton switch 56 such that pushbutton switch 56 can be manually actuated.

It should be noted that in some embodiments, operating cover 60 from the guarded position to the unguarded position not only provides mechanical access to pushbutton switch 56 but also electrically transitions pushbutton switch 56 from an unarmed state to an armed state such that a subsequent manually actuated of pushbutton switch 56 will cause the desired function; deployment of the floats in the above example. In addition, in some embodiments, cover 60 is a spring-loaded cover in which the guarded position and the unguarded position are stable positions, thereby requiring an opening force to pivot cover 60 from the guarded position to the unguarded position and requiring a closing force to pivot cover 60 from the unguarded position to the guarded position.

In most situations, the inclusion of flip guard 58 protecting pushbutton switch 56 provides the desired level of safety. In the present example, however, as pushbutton switch 56 and thus flip guard 58 are located on a substantially horizontally oriented control panel and due to the configuration of cover 60, it is possible for cover 60 of flip guard 58 to be unintentionally lifted, which would expose pushbutton switch 56 to a potential inadvertent actuation. The present embodiments of flip guard safety system 46 overcome this risk by mechanically retaining cover 60 in the guarded position. More specifically, flip guard safety system 46 includes a flip guard safety 62 having a gate 64 that pivots between a closed position, as best seen in FIG. 5A, and an open position, as best seen in FIG. 5B. In the closed position, gate 64 retains cover 60 of flip guard 58 in the guarded position (see FIGS. 4A and 5A). In the open position, gate 64 does not retain cover 60 of flip guard 58 in the guarded position (see FIGS. 4B and 5B), such that cover 60 of flip guard 58 may be manually pivoted from the guarded position to the unguarded position (compare FIGS. 4B and 5B to FIGS. 4C and 5C). In the illustrated embodiment, gate 64 of flip guard safety 62 pivots from the closed position to the open position in a first direction, denoted as direction 66a in FIG. 5B, and cover 60 of flip guard 58 pivots from the guarded position to the unguarded position in a second direction, denoted as direction 66b in FIG. 5C, that is opposite of direction 66a. In this manner, access to pushbutton switch 56 requires dual opposing operation of gate 64 of flip guard safety 62 and cover 60 of flip guard 58, which greatly reduces the likelihood of an unintentional lifting of cover 60 of flip guard 58 and thus, greatly reduces the likelihood of inadvertent actuation of pushbutton switch 56.

Referring additionally to FIGS. 6A-6C and 7A-7C in the drawings, flip guard safety 62 will be disclosed in greater detail. In the illustrated embodiments, flip guard safety 62 has a base 70 that includes receivers 72a, 72b, a cross member 74 that extends between receivers 72a, 72b and legs 76a, 76b that respectively extend from receivers 72a, 72b and are generally perpendicular to cross member 74. Cross member 74 includes a centrally located shelf 78 that is positioned between receivers 72a, 72b the width and thickness of which may be adjusted to tailor the stiffness and particularly the bending stiffness of cross member 74. On upper portions thereof, receiver 72a includes a stop 80a and receiver 72b includes a stop 80b. Flip guard safety 62 also has gate 64 that includes arms 84a, 84b and a cross member 86 that extends between arms 84a, 84b. Cross member 86 includes a centrally located handle 82. On proximal outboard portions thereof, arm 84a includes a tab 88a and arm 84b includes a tab 88b. On distal outboard portions thereof, arm 84a includes a pin 90a and arm 84b includes a pin 90b. Base 70 and gate 64 may be formed from any suitable material such as metals, plastics or combinations thereof using any suitable manufacturing techniques including additive and subtractive processes including 3D printing of base 70 and gate 64 either individually for later assembly or as a unit. For example, flip guard safety 62 may be assembled by inserting pin 90a into the opening of receiver 72a and inserting pin 90b into the opening of receiver 72b forming a hinge for gate 64 such that gate 64 is operable to rotate relative to base 70 about a pivot axis 92 (see FIG. 4B). It is noted that once pin 90a has mated with receiver 72a and pin 90b has mated with receiver 72b, shelf 78 becomes a barrier to the removal of gate 64 from base 70.

The operation of flip guard safety system 46 will now be discussed. During normal flight conditions for aircraft 10, flip guard safety system 46 protects pushbutton switch 56 against inadvertent actuation by positioning cover 60 in the guarded position over pushbutton switch 56 and positioning gate 64 in the closed position over cover 60. Regardless of orientation, the closed position of gate 64 is a stable position requiring a force to pivot gate 64 from the closed position to the open position. Specifically, as best seen in FIG. 7A, stops 80a, 80b of base 70 resist the movement of gate 64 from the closed position to the open position by interfering with tabs 88a, 88b of gate 64 as the distance L1 between stops 80a, 80b is less than the width L2 of gate 64 at tabs 88a, 88b. It is noted that in a horizontal orientation, gravity assists in making the closed position of gate 64, a stable position as stops 80a, 80b have an angle 94 relative to the vertical (see FIG. 5A). While the closed position of gate 64 is a stable position, gate 64 is preferably capable of slight rotation between contact with cover 60 and contact with stops 80a, 80b such that vibratory motion does not tend to create an opening force on gate 64. When it is desired to actuate pushbutton switch 56, the pilot engages handle 82 of gate 64 and inputs an opening force thereon sufficient to cause receivers 72a, 72b to tilt or bow outwardly responsive to the forced applied thereto by tabs 88a, 88b. When the distance between stops 80a, 80b has expanded from L1 to L2, as best seen in FIG. 7B, tabs 88a, 88b are able to pass through stops 80a, 80b, enabling gate 64 to pivot to the open position. Once tabs 88a, 88b pass through stops 80a, 80b, receivers 72a, 72b return to their original positions, as best seen in FIG. 7C. Once gate 64 is in the open position, cover 60 of flip guard 58 may be manually pivoted from the guarded position to the unguarded position which exposes pushbutton switch 56 for manual actuation. Access to pushbutton switch 56 thus requires dual opposing operation of gate 64 of flip guard safety 62 in one direction and cover 60 of flip guard 58 in the opposite direction.

Figure 8C:
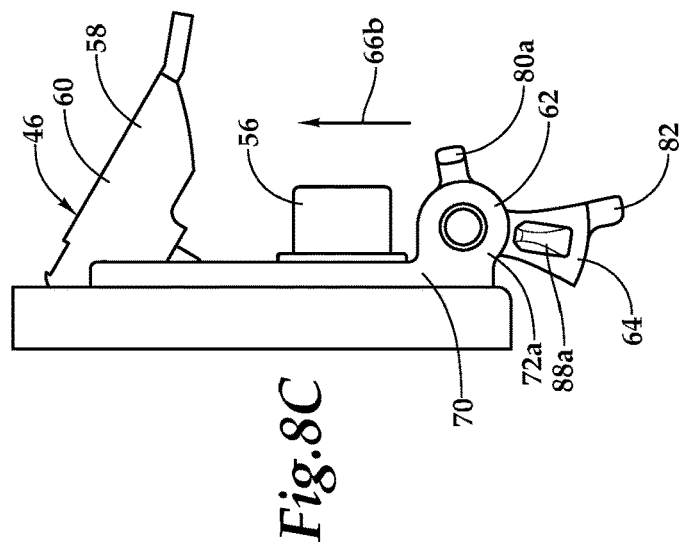
FIGS. 8A-8C are sequential views showing a flip guard safety system for preventing inadvertent actuation of an aircraft switch in various positions in accordance with embodiments of the present disclosure.
Figure 8B:
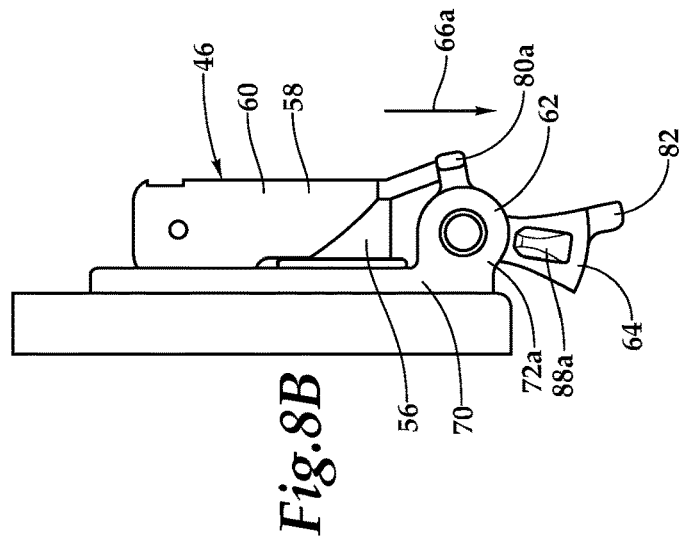
Figure 8A:
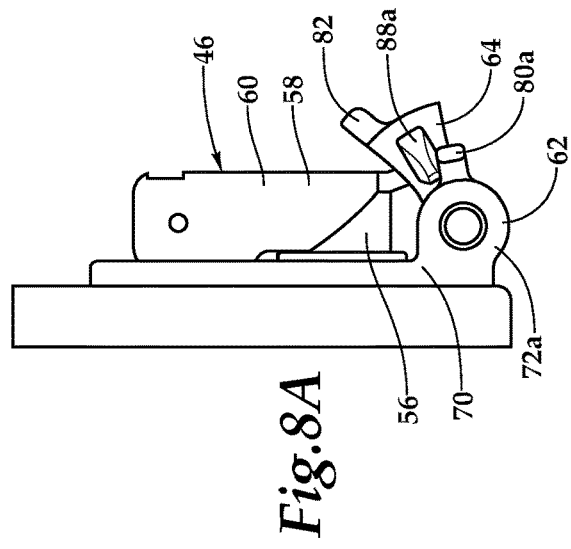

Even though flip guard safety system 46 has been depicted and described in a horizontal orientation, it should be understood by those having ordinary skill in the art that the flip guard safety systems of the present disclosure can be used in any orientation. For example, as best seen in FIGS. 8A-8B, flip guard safety system 46 is depicted in a vertical orientation. During normal flight conditions for aircraft 10, flip guard safety system 46 protects pushbutton switch 56 against inadvertent actuation by positioning cover 60 in the guarded position over pushbutton switch 56 and positioning gate 64 in the closed position over cover 60. In the vertical orientation, the closed position of gate 64 remains a stable position requiring a force to pivot gate 64 from the closed position to the open position as stops 80a, 80b of base 70 interfere with tabs 88a, 88b of gate 64 (see FIG. 8A). When it is desired to actuate pushbutton switch 56, the pilot engages handle 82 of gate 64 and inputs an opening force thereon sufficient to cause receivers 72a, 72b to tilt or bow outwardly responsive to the forced applied thereto by tabs 88a, 88b until tabs 88a, 88b are able to pass through stops 80a, 80b enabling gate 64 to pivot to the open position (see FIG. 8B). Once gate 64 is in the open position, cover 60 of flip guard 58 may be manually pivoted from the guarded position to the unguarded position which exposes pushbutton switch 56 for manual actuation (see FIG. 8C). In this orientation, access to pushbutton switch 56 requires dual opposing operation of gate 64 of flip guard safety 62 in the downward direction 66a and cover 60 of flip guard 58 in the upward direction 66b.

Figure 9:
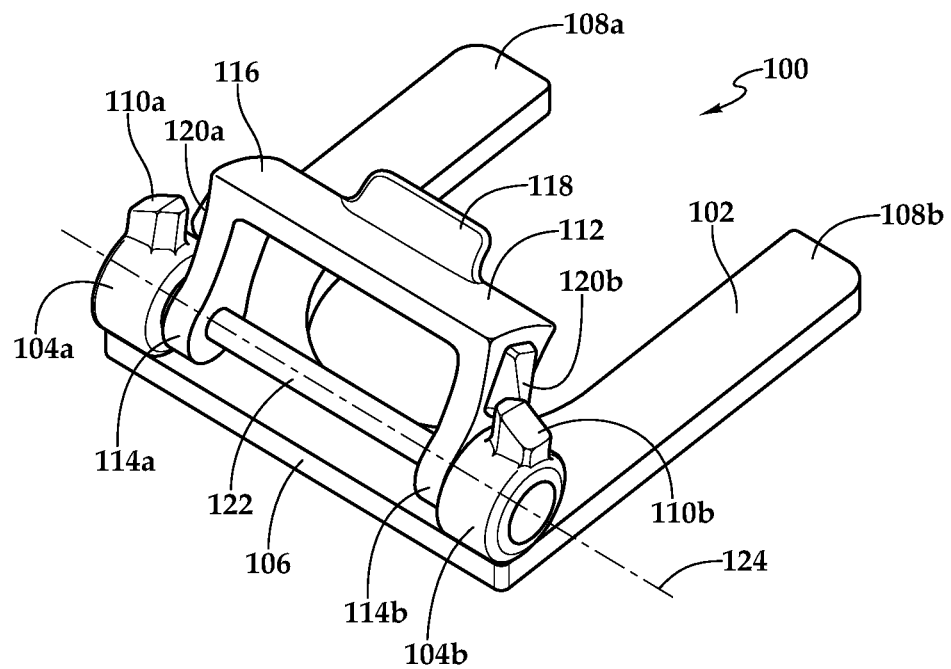
FIG. 9 is a schematic illustration of a flip guard safety of a flip guard safety system for preventing inadvertent actuation of an aircraft switch in accordance with embodiments of the present disclosure.

Referring next to FIG. 9 in the drawings, another embodiment of a flip guard safety of a flip guard safety system of the present disclosure is schematically illustrated and generally designated 100. Flip guard safety 100 has a base 102 that includes receivers 104a, 104b, a cross member 106 that extends between receivers 104a, 104b and legs 108a, 108b that respectively extend from receivers 104a, 104b and are generally perpendicular to cross member 106. On upper portions thereof, receiver 104a includes a stop 110a and receiver 104b includes a stop 110b. Flip guard safety 100 also has gate 112 that includes arms 114a, 114b and a cross member 116 that extends between arms 114a, 114b. Cross member 116 includes a centrally located handle 118. On proximal outboard portions thereof, arm 114a includes a tab 120a and arm 114b includes a tab 120b. In the illustrated embodiment, flip guard safety 100 is assembled by inserting pin 122 through openings in receiver 104a, arms 114a, 114b and receiver 104b forming a hinge such that gate 112 is operable to rotate relative to base 102 about pivot axis 124. Flip guard safety 100 operates in substantially the same manner as flip guard safety 62 discussed herein.

Figure 10:
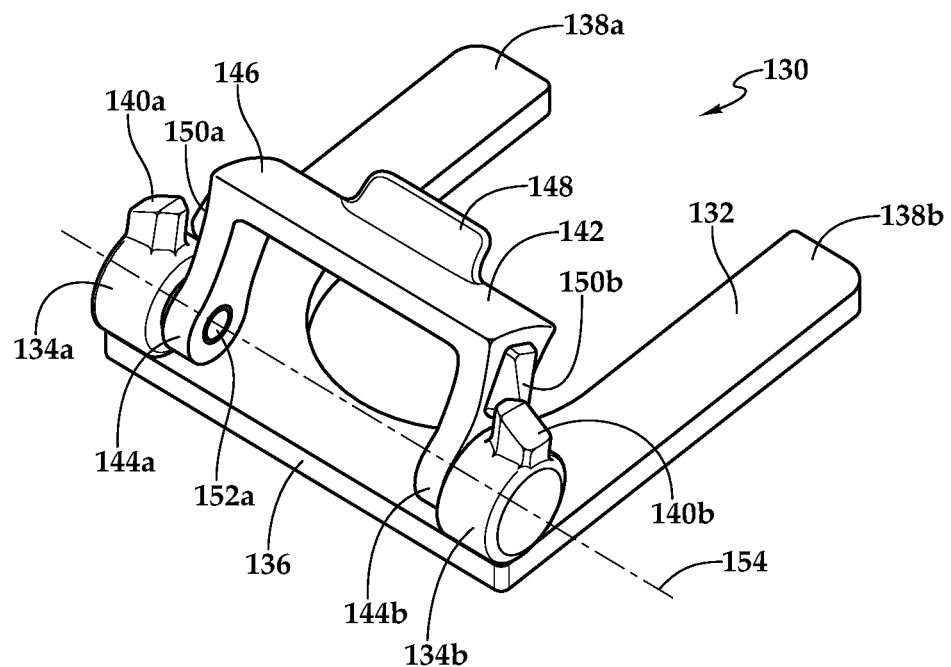
FIG. 10 is a schematic illustration of a flip guard safety of a flip guard safety system for preventing inadvertent actuation of an aircraft switch in accordance with embodiments of the present disclosure.

Referring next to FIG. 10 in the drawings, another embodiment of a flip guard safety for a flip guard safety system of the present disclosure is schematically illustrated and generally designated 130. Flip guard safety 130 has a base 132 that includes receivers 134a, 134b, a cross member 136 that extends between receivers 134a, 134b and legs 138a, 138b that respectively extend from receivers 134a, 134b and are generally perpendicular to cross member 136. On upper portions thereof, receiver 134a includes a stop 140a and receiver 134b includes a stop 140b. Flip guard safety 100 also has gate 142 that includes arms 144a, 144b and a cross member 146 that extends between arms 144a, 144b. Cross member 146 includes a centrally located handle 148. On proximal outboard portions thereof, arm 144a includes a tab 150a and arm 144b includes a tab 150b. In the illustrated embodiment, flip guard safety 130 is assembled by installing arms 144a, 144b on pins that extend inboard from receivers 134a, 134b, only pin 152a being visible in the drawing, forming a hinge such that gate 142 is operable to rotate relative to base 132 about pivot axis 154. The pins in the present embodiment may be integral with receivers 134a, 134b or may be independent components that extend through openings in receivers 134a, 134b. Flip guard safety 130 operates in substantially the same manner as flip guard safety 62 discussed herein.

Figure 11:
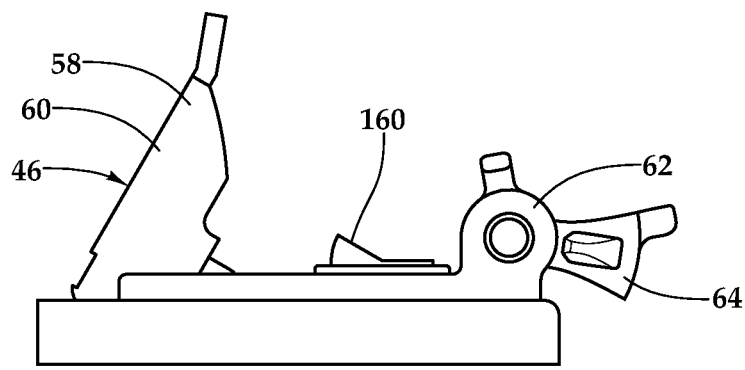
FIG. 11 is a schematic illustration of a flip guard safety system for preventing inadvertent actuation of an aircraft switch in accordance with embodiments of the present disclosure.
Figure 12:
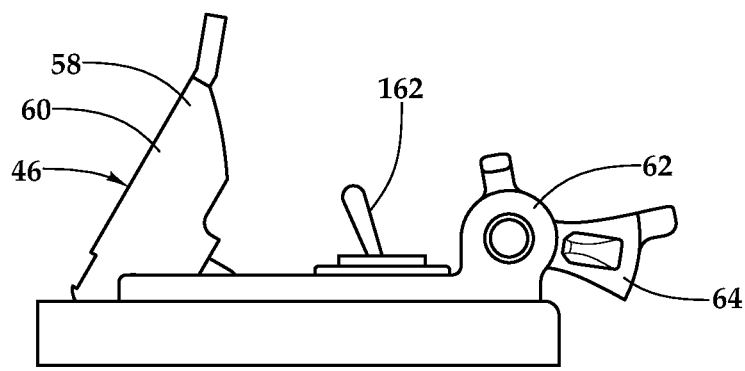
FIG. 12 is a schematic illustration of a flip guard safety system for preventing inadvertent actuation of an aircraft switch in accordance with embodiments of the present disclosure.
Figure 13:
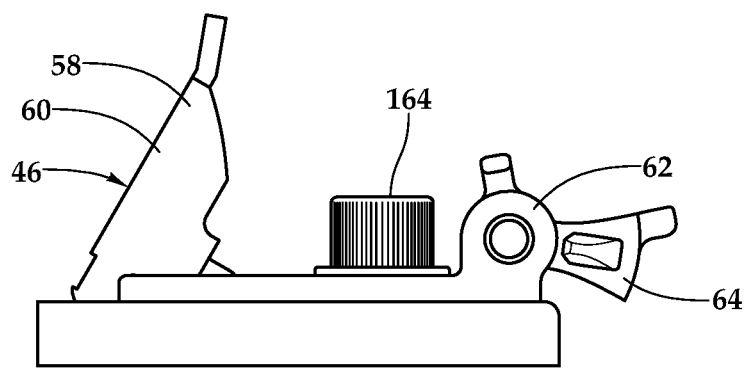
FIG. 13 is a schematic illustration of a flip guard safety system for preventing inadvertent actuation of an aircraft switch in accordance with embodiments of the present disclosure.

Even though the flip guard safety systems disclosed herein have been depicted and described as protecting pushbutton switches, it should be understood by those having ordinary skill in the art that the flip guard safety systems of the present disclosure are suitable for protecting other types of hand switches. For example, FIG. 11 depicts a flip guard safety system 46 used to protect a rocker switch 160 with cover 60 of flip guard 58 in the unguarded position and gate 64 of flip guard safety 62 in the open position. In another example, FIG. 12 depicts a flip guard safety system 46 used to protect a toggle switch 162 with cover 60 of flip guard 58 in the unguarded position and gate 64 of flip guard safety 62 in the open position. In a further example, FIG. 13 depicts a flip guard safety system 46 used to protect a dial switch 164 with cover 60 of flip guard 58 in the unguarded position and gate 64 of flip guard safety 62 in the open position.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A flip guard safety system for preventing inadvertent actuation of an aircraft switch, the flip guard safety system comprising:
a flip guard having a cover that pivots between guarded and unguarded positions, in the guarded position, the cover is configured to protect the aircraft switch against inadvertent actuation, in the unguarded position, the cover is configured to provide access to the aircraft switch; and
a flip guard safety having a base and a gate that pivots relative to the base between closed and open positions, in the closed position, the gate retains the cover of the flip guard in the guarded position, in the open position, the gate does not retain the cover of the flip guard in the guarded position, such that the cover of the flip guard is pivotable from the guarded position to the unguarded position;
wherein, the base includes at least one stop and the gate includes at least one tab such that the at least one stop interferes with the at least one tab to resist the gate pivoting from the closed position to the open position;
wherein, the gate of the flip guard safety pivots from the closed position to the open position in a first direction; and
wherein, the cover of the flip guard pivots from the guarded position to the unguarded position in a second direction that is opposite of the first direction, thereby requiring dual opposing operation to provide access to the aircraft switch.

2. The flip guard safety system as recited in claim 1 wherein, the aircraft switch is an emergency aircraft switch.

3. The flip guard safety system as recited in claim 1 wherein, the aircraft switch is a hand switch.

4. The flip guard safety system as recited in claim 1 wherein, the aircraft switch is a pushbutton switch.

5. The flip guard safety system as recited in claim 1 wherein, the aircraft switch is a rocker switch.

6. The flip guard safety system as recited in claim 1 wherein, the aircraft switch is a toggle switch.

7. The flip guard safety system as recited in claim 1 wherein, the aircraft switch is a dial switch.

8. The flip guard safety system as recited in claim 1 wherein, the cover of the flip guard is a spring-loaded cover; and
wherein, the guarded position and the unguarded position of the cover are stable positions.

9. The flip guard safety system as recited in claim 1 wherein, the aircraft switch has an unarmed state and an armed state; and
wherein, the aircraft switch is transitioned from the unarmed state to the armed state when the cover of the flip guard pivots from the guarded position to the unguarded position.

10. The flip guard safety system as recited in claim 1 wherein, the base includes first and second receivers;
wherein, the gate includes first and second pins; and
wherein, the first pin is positioned within the first receiver and the second pin is positioned within the second receiver forming a hinge with a hinge axis about which the gate pivots between the open and closed positions.

11. The flip guard safety system as recited in claim 10 wherein, the first receiver includes the first stop and the second receiver includes a second stop;
wherein, the gate includes a first arm having the first tab and a second arm having a second tab; and
wherein, the first stop interferes with the first tab and the second stop interferes with the second tab to resist the gate pivoting from the closed position to the open position.

12. The flip guard safety system as recited in claim 11 wherein, a distance between the first and second stops increases as the first and second tabs pass between the first and second stops when the gate pivots from the closed position to the open position.

13. The flip guard safety system as recited in claim 10 wherein, the base of the flip guard safety includes a shelf disposed between the first and second receivers.

14. The flip guard safety system as recited in claim 10 wherein, the base of the flip guard safety includes a first leg extending from the first receiver and a second leg extending from the second receiver.

15. The flip guard safety system as recited in claim 14 wherein, the aircraft switch is disposed between the first and second legs of the base of the flip guard safety.

16. The flip guard safety system as recited in claim 14 wherein, the flip guard is at least partially disposed between the first and second legs of the base of the flip guard safety.

17. The flip guard safety system as recited in claim 1 wherein, the base of the flip guard safety is substantial horizontally oriented.

18. The flip guard safety system as recited in claim 1 wherein, the base of the flip guard safety is not horizontally oriented.

19. A flight deck for an aircraft, the flight deck comprising:
an aircraft switch;

a flip guard having a cover that pivots between guarded and unguarded positions, in the guarded position, the cover is configured to protect the aircraft switch against inadvertent actuation, in the unguarded position, the cover is configured to provide access to the aircraft switch; and a flip guard safety having a base and a gate that pivots relative to the base between closed and open positions, in the closed position, the gate retains the cover of the flip guard in the guarded position, in the open position, the gate does not retain the cover of the flip guard in the guarded position, such that the cover of the flip guard is pivotable from the guarded position to the unguarded position;

wherein, the base includes at least one stop and the gate includes at least one tab such that the at least one stop interferes with the at least one tab to resist the gate pivoting from the closed position to the open position;

wherein, the gate of the flip guard safety pivots from the closed position to the open position in a first direction; and wherein, the cover of the flip guard pivots from the guarded position to the unguarded position in a second direction that is opposite of the first direction, thereby requiring dual opposing operation to provide access to the aircraft switch.

20. An aircraft comprising:

a fuselage;

a flight deck positioned within the fuselage, the flight deck including:

an aircraft switch;

a flip guard having a cover that pivots between guarded and unguarded positions, in the guarded position, the cover is configured to protect the aircraft switch against inadvertent actuation, in the unguarded position, the cover is configured to provide access to the aircraft switch; and a flip guard safety having a base and a gate that pivots relative to the base between closed and open positions, in the closed position, the gate retains the cover of the flip guard in the guarded position, in the open position, the gate does not retain the cover of the flip guard in the guarded position, such that the cover of the flip guard is pivotable from the guarded position to the unguarded position;

wherein, the base includes at least one stop and the gate includes at least one tab such that the at least one stop interferes with the at least one tab to resist the gate pivoting from the closed position to the open position;

wherein, the gate of the flip guard safety pivots from the closed position to the open position in a first direction; and wherein, the cover of the flip guard pivots from the guarded position to the unguarded position in a second direction that is opposite of the first direction, thereby requiring dual opposing operation to provide access to the aircraft switch.

* * * * *